(12) United States Patent
Somayajula et al.

(10) Patent No.: US 8,965,366 B1
(45) Date of Patent: Feb. 24, 2015

(54) WORLD SIM

(75) Inventors: Siva Rama Kumar Somayajula, Palo Alto, CA (US); Clifton Liu, Santa Clara, CA (US); Kenneth P. Kiraly, Menlo Park, CA (US); Varadarajan Gopalakrishnan, Cupertino, CA (US); Jay P. Desai, Cupertino, CA (US); Subram Narasimhan, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 369 days.

(21) Appl. No.: 12/708,476

(22) Filed: Feb. 18, 2010

(51) Int. Cl.
*H04W 4/00* (2009.01)
*H04M 1/66* (2006.01)
*H04W 36/00* (2009.01)
*H04M 3/00* (2006.01)
*H04W 60/00* (2009.01)
*H04W 48/16* (2009.01)

(52) U.S. Cl.
CPC .............. *H04W 60/00* (2013.01); *H04W 48/16* (2013.01)
USPC ...................... 455/435.1; 455/432.1; 455/436; 455/410; 455/418; 370/328; 370/329; 370/331

(58) Field of Classification Search
CPC ......... H04W 8/183; H04W 8/18; H04W 8/06; H04W 8/265; H04W 8/245; H04W 48/16; H04W 48/18; H04W 88/02; H04W 88/06; H04W 12/06; H04W 4/003; H04W 4/001; G06Q 30/0283; G06Q 30/0601; H04L 63/0853
See application file for complete search history.

(56) References Cited

U.S. PATENT DOCUMENTS

| | | | |
|---|---|---|---|
| 5,534,888 A | 7/1996 | Lebby et al. | |
| 5,566,098 A | 10/1996 | Lucente et al. | |
| 5,603,084 A | 2/1997 | Henry, Jr. et al. | |
| 5,663,748 A | 9/1997 | Huffman et al. | |
| 5,761,485 A | 6/1998 | Munyan | |
| 5,847,698 A | 12/1998 | Reavey et al. | |
| 5,887,253 A | 3/1999 | O'Neil et al. | |
| 5,999,811 A * | 12/1999 | Molne ........................ | 455/432.3 |
| 6,341,270 B1 | 1/2002 | Esposito et al. | |
| 6,393,298 B1 | 5/2002 | Fulton | |
| 6,879,825 B1 | 4/2005 | Daly | |
| 6,915,272 B1 | 7/2005 | Zilliacus et al. | |
| 6,947,922 B1 | 9/2005 | Glance | |

(Continued)

FOREIGN PATENT DOCUMENTS

KR  1020060128515   * 12/2006
WO  WO 02104062 A1 * 12/2002

OTHER PUBLICATIONS

USPTO Office Action for U.S. Appl. No. 12/708,488 mailed Apr. 27, 2012.

(Continued)

*Primary Examiner* — Dwayne Bost
*Assistant Examiner* — Nalini Mummalaneni
(74) *Attorney, Agent, or Firm* — Lowenstein Sandler LLP

(57) ABSTRACT

A user device obtains a device profile corresponding to a primary wireless network at a current location of the user device, reprograms a modem of the user device using the device profile corresponding to the primary wireless network at the current location of the user device, and establishes a network connection using the device profile corresponding to the primary wireless network at the current location of the user device.

28 Claims, 11 Drawing Sheets

(56) References Cited

U.S. PATENT DOCUMENTS

| | | |
|---|---|---|
| 7,009,596 B2 | 3/2006 | Seet et al. |
| 7,027,575 B1 | 4/2006 | Burgess |
| 7,298,851 B1 | 11/2007 | Hendricks et al. |
| 7,304,635 B2 | 12/2007 | Seet et al. |
| 7,350,704 B2 | 4/2008 | Barsness et al. |
| 7,694,874 B2 | 4/2010 | Narasimhan et al. |
| 2002/0037724 A1 | 3/2002 | Chatterjee et al. |
| 2002/0066033 A1 | 5/2002 | Dobbins et al. |
| 2002/0128984 A1 | 9/2002 | Mehta et al. |
| 2003/0181219 A1 | 9/2003 | Huang |
| 2004/0033797 A1 | 2/2004 | Raivisto et al. |
| 2004/0064369 A1 | 4/2004 | Kato |
| 2004/0138958 A1 | 7/2004 | Watarai et al. |
| 2004/0192306 A1 | 9/2004 | Elkarat et al. |
| 2004/0236849 A1 | 11/2004 | Cooper et al. |
| 2004/0242209 A1 | 12/2004 | Kruis et al. |
| 2005/0107109 A1 | 5/2005 | Gunaratnam et al. |
| 2005/0182847 A1 | 8/2005 | Jawad Pirzada et al. |
| 2005/0186942 A1 | 8/2005 | Griffin |
| 2005/0202841 A1 | 9/2005 | Brobston et al. |
| 2006/0168123 A1 | 7/2006 | Krstulich |
| 2006/0259462 A1 | 11/2006 | Timmons |
| 2006/0281058 A1 | 12/2006 | Mangoaela |
| 2007/0011061 A1 | 1/2007 | East |
| 2007/0015510 A1 | 1/2007 | Xiang |
| 2007/0015538 A1* | 1/2007 | Wang .......................... 455/558 |
| 2007/0275717 A1 | 11/2007 | Edge et al. |
| 2008/0126586 A1 | 5/2008 | Shih |
| 2008/0132229 A1* | 6/2008 | Oommen et al. .......... 455/432.3 |
| 2008/0164304 A1* | 7/2008 | Narasimhan et al. ......... 235/375 |
| 2008/0171532 A1 | 7/2008 | Shieh et al. |
| 2009/0149175 A1 | 6/2009 | Lopresti et al. |
| 2009/0185492 A1 | 7/2009 | Senarath et al. |
| 2009/0215447 A1 | 8/2009 | Catalano et al. |
| 2010/0192212 A1* | 7/2010 | Raleigh ............................ 726/7 |
| 2010/0311444 A1* | 12/2010 | Shi et al. ...................... 455/466 |

OTHER PUBLICATIONS

USPTO Office Action for U.S. Appl. No. 12/708,483 mailed Jun. 20, 2012.

USPTO Office Action for U.S. Appl. No. 12/708,488 mailed Oct. 2, 2012.

USPTO Office Action for U.S. Appl. No. 12/708,483 mailed Feb. 15, 2013.

PCT International Search Report and Written Opinion for PCT Application No. PCT/US2008/057867, mailed Aug. 7, 2008, 3 pages.

PCT International Search Report and Written Opinion for PCT Application No. PCT/US2007/089123, mailed Jun. 27, 2008, 4 pages.

* cited by examiner

WORLD SIM

FIELD OF INVENTION

Embodiments of the invention relate to user devices, and more particularly, to enabling a user device to use different wireless carriers for network connectivity.

BACKGROUND OF THE INVENTION

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, and the like. As the quantity of available electronic media content continues to grow, along with increasing proliferation of devices to consume that media content, providing network connectivity for such user devices in a cost efficient manner continues to be a priority.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Methods and systems for enabling a user device to use different wireless carriers for network connectivity are described. A user device may be any content rendering device that includes a wireless modem for connecting the user device to a network. Examples of such user devices include electronic book readers, cellular telephones, personal digital assistants (PDAs), portable media players, tablet computers, netbooks, and the like. A user device may connect to a network to obtain content from an item providing system or to perform other activity.

In one embodiment, device profiles associated with different wireless carriers are maintained. The device profiles may be stored on the user device and/or the item providing system. Each device profile includes a subscriber identity module (SIM) profile pertaining to a particular wireless carrier. In some embodiments, a device profile also includes a modem profile that defines connection parameters for a particular wireless carrier.

In one embodiment, a wireless modem of a user device is initially programmed with a default device profile associated with a default wireless carrier. When the user device is powered-on, it determines whether the default device profile corresponds to a wireless network detected at the current location of the user device. If so, the modem will use the default device profile for network connectivity. If not, the user device obtains an appropriate device profile that corresponds to a primary wireless network at the current location and reprograms the modem with the obtained device profile. The user device may obtain the appropriate device profile by retrieving it from local memory or by requesting it from the item providing system. The modem then establishes a network connection with the primary wireless network using the obtained device profile.

Accordingly, user devices no longer need to have different versions of modems for use with different wireless carriers. Instead, user devices can be built with the same modem that can be automatically reconfigured, during device operation, to a different wireless carrier if needed. As a result, a user device can be powered-on in any country and automatically use a primary wireless carrier. This can be further optimized to select a primary wireless carrier based on billing rates, coverage in the country, etc.

Figure 1:
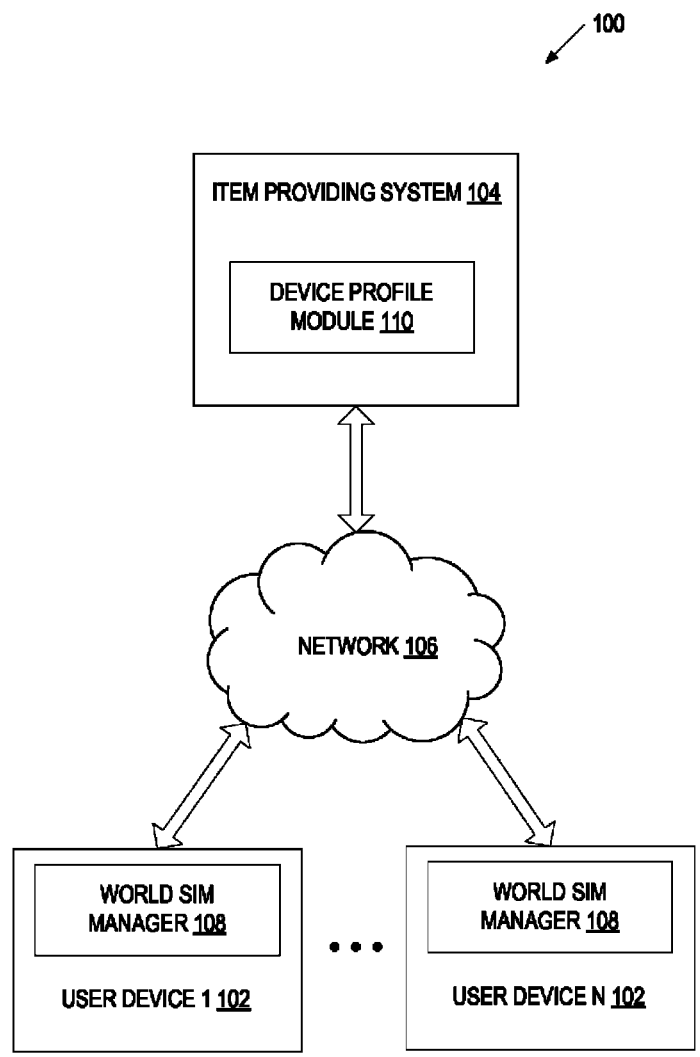
FIG. 1 is a block diagram of an exemplary network architecture in which embodiments of the invention may operate.

FIG. 1 is a block diagram of exemplary network architecture 100 in which embodiments of the invention may operate. The network architecture 100 may include an item providing system 104 and multiple user devices 102 coupled to the item providing system 104 via a network 106 (e.g., public network such as the Internet or private network such as a local area network (LAN)).

The user devices 102 are variously configured with different functionality to enable consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), and multi-media content. The user devices 102 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 104 downloads items, upgrades, and/or other information to the user devices 102 via the network 106. The item providing system 104 also receives various requests, instructions and other data from the user devices 102 via the network 106. The item providing system 104 may include one or more machines (e.g., one or more server computer systems, routers, gateways) that have processing and storage capabilities to provide the above functionality.

Communication between the item providing system 104 and a user device 102 may be enabled via any communication infrastructure. One example of such an infrastructure includes a combination of a wide area network (WAN) and wireless infrastructure, which allows a user to use the user device 102 to purchase items and consume items without being tethered to the item providing system 104 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 102. Yet alternatively, the wireless infrastructure may be provided by an access point (e.g., WiFi access point) provider system.

The communication infrastructure may also include a communication-enabling system that serves as an intermediary in passing information between the item providing system 104 and the wireless carrier. The communication-enabling system may communicate with the wireless carrier via a dedicated channel, and may communicate with the item providing system 104 via a non-dedicated communication mechanism, e.g., a public network such as the Internet.

The item providing system 104 may pay the wireless carrier a fee based on the aggregate use of the wireless carrier system by all of the user devices 102. The item providing system 104 may recoup these costs through fees charged to the end-users separately or as part of other purchases (e.g., purchase of digital content) made by the end-users. Alternatively, the wireless carrier may submit bills directly to individual users, or may submits bills to either the item providing system 104 (in aggregate) or to the individual users, at the option of the individual respective users.

A user device 102 is typically associated with a specific wireless carrier by means of a subscriber identity module (SIM) card. A SIM card includes information identifying the user device to the specific wireless carrier. This information may include a unique international mobile subscriber identity (IMSI) containing a mobile country code, (MCC), a mobile network code (MNC) and a mobile station identification number (MSIN) within the wireless carrier's customer base. The SIM card may also include security authentication and ciphering information, temporary information related to the local network, a list of the services the user has access to, etc. In addition to the association via a SIM card, a wireless modem of a user device may be pre-configured with a modem profile that defines network connection parameters for a relevant wireless carrier.

Depending on the location of the user device 102, the wireless carrier that the user device 102 is associated with may not provide access to a primary wireless network at the current location of the user device 102. A primary wireless network can be defined, for example, as a network having coverage at the current location of the user device 102, a preferred local network at the current location of the user device 102 in terms of existing contracts with the item providing system 104 or the end-user, billing rates and/or provided performance characteristics (e.g., continuing coverage, signal strength, speed), or the like. Hence, when the user device 102 is associated with a wireless carrier that does not provide direct access to a primary wireless network at a current location of the user device 102, the device's network usage results in undesirable costs (e.g., roaming charges or higher billing rates) and/or undesirable performance.

Embodiments of the invention overcome the above shortcomings by maintaining multiple device profiles associated with different wireless carriers. The device profiles may be stored on the user device 102 and/or the item providing system 104. Each device profile includes a subscriber identity module (SIM) profile pertaining to a particular wireless carrier. A SIM profile includes settings of a specific wireless carrier such as the IMSI, security authentication and ciphering information, etc. In some embodiments, a device profile also includes a modem profile that defines connection parameters for a particular wireless carrier, such as a GSM frequency band parameter, the format for presenting the wireless carrier name on the user device, wireless protocol configuration data, etc. Based on the stored device profiles, a device profile corresponding to a primary wireless network at a current location of the user device 102 can be identified and used to reprogram the modem of the user device 102, allowing the user device 102 to receive network access directly via the primary wireless network.

In one embodiment, the user device 102 includes a world SIM manager 108 that is responsible for reprogramming the modem of the user device 102 with a device profile corresponding to the primary wireless network when the user device 102 is powered on. The world SIM manager 108 may obtain the device profile corresponding to the primary wireless network by retrieving this device profile from local memory or by requesting it from the item providing system 104. Additional functionality of the world SIM manager 108 will be discussed in more detail below.

In one embodiment, the item providing system 104 includes a device profile module 110. The device profile module 110 may be responsible for providing appropriate device profiles to the user devices 102 if such device profiles are not stored locally, and for performing other functions as will be discussed in more detail below.

Figure 2:
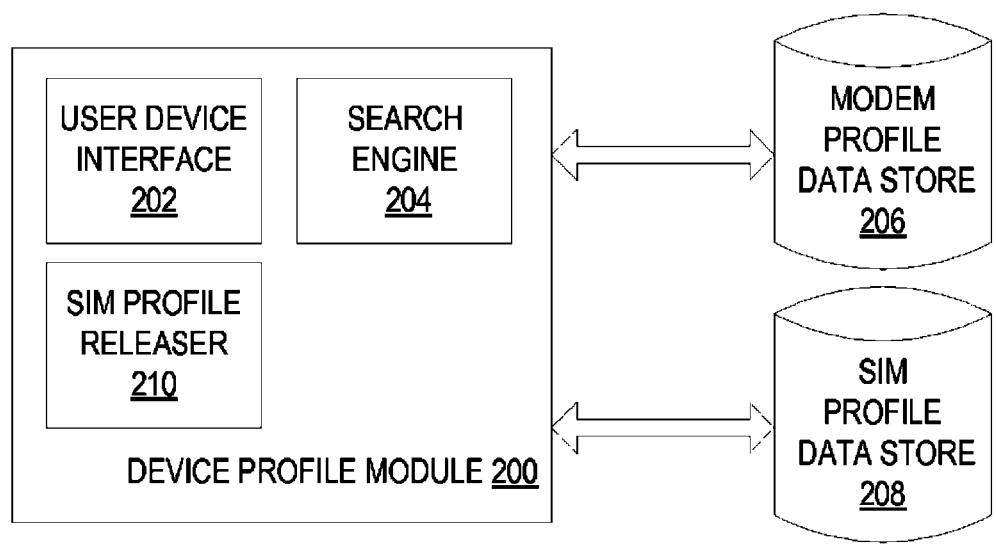
FIG. 2 is a block diagram of one embodiment of a device profile module.

FIG. 2 is a block diagram of one embodiment of a device profile module 200. The device profile module 200 may be the same as device profile module 110 of FIG. 1 and may include a user device interface 202, a search engine 204 and a SIM profiler releaser 210. The components of the device profile module 200 may represent modules that can be combined together or separated into further modules, according to some embodiments.

The user device interface 202 receives data from, and provides data to multiple user devices. In particular, the user device interface 202 may receive requests of user devices for specific device profiles and may invoke the search engine 204 to find an appropriate device profile in a data store 206 and/or a data store 208. The device profiles may include SIM profiles associated with different wireless carriers. In addition, in some embodiments, the device profiles may include modem profiles that define network connection parameters for relevant wireless carriers. The SIM profiles are stored in the SIM profile data store 208, and the modem profiles may be stored in the modem profile data store 206. The data stores 206 and 208 may represent a single data structure (e.g., a repository, a table, a file) or two different data structures residing on one or more mass storage devices, such as magnetic or optical storage based disks, tapes or hard drives.

The SIM profile releaser 210 receives the user devices' registration requests identifying currently used SIM profiles and determines a default SIM profile and optionally some other unused SIM profiles of each user device. The unused SIM profiles may be SIM profiles originally stored on the user device that are unlikely to be used by the user device. For example, if the user device is built with SIM profiles of wireless carriers in the U.S., Europe, Australia and South America, and the user buys the device in the U.S. but powers it on in Germany, the SIM profile releaser 210 may decide that the user device is unlikely to use SIM profiles of wireless carriers in Australia and South America. The SIM profile releaser 200 may maintain a list of SIM profiles originally stored on each user device, and may use this list to identify SIM profiles no longer needed by the user device. Upon identifying unneeded SIM profiles, the SIM profile releaser 210 releases the unused SIM profiles for future use with new user devices by a user device manufacturer. The SIM profile releaser 210 then notifies the user device about the SIM profile(s) that need to be removed from memory of the user device.

Figure 3:
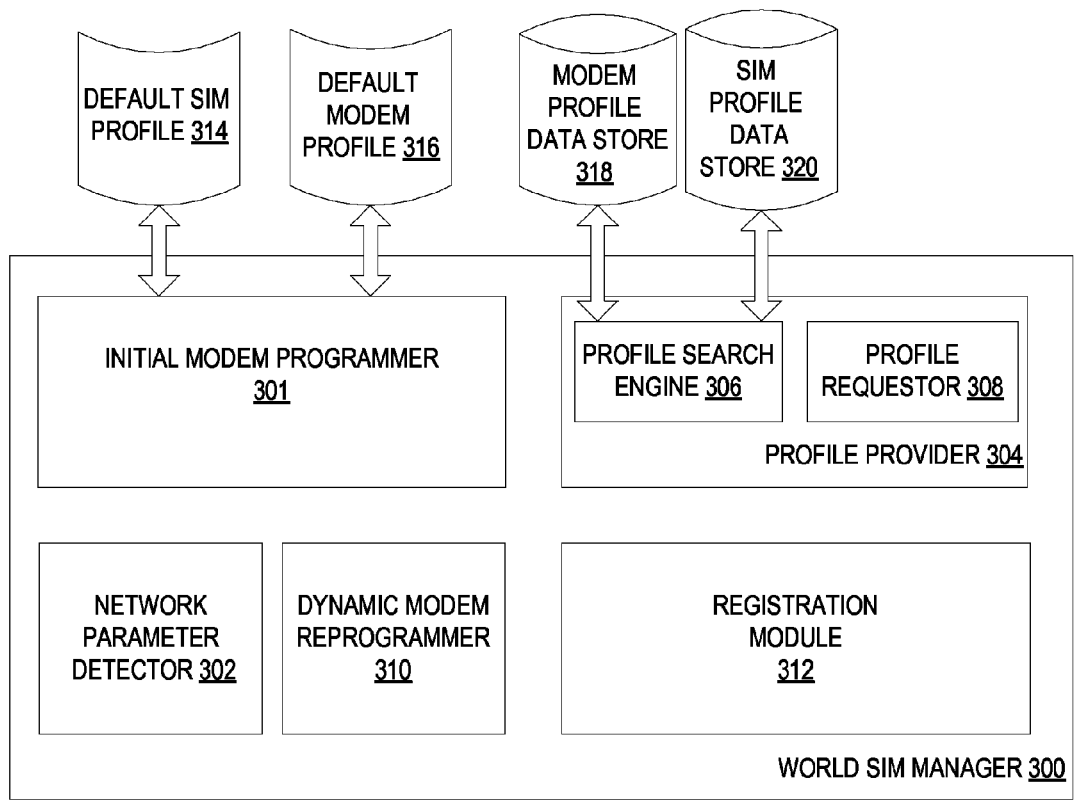
FIG. 3 is a block diagram of one embodiment of a world SIM manager.

FIG. 3 is a block diagram of one embodiment of a world SIM manager 300. The world SIM manager 300 may be the same as world SIM manager 108 of FIG. 1 and may include a network parameter detector 302, a profile provider 304, an initial modem programmer 301, a dynamic modem reprogrammer 310, and a registration module 312. The components of the world SIM manager 300 may represent modules that can be combined together or separated into further modules, according to some embodiments.

The user device hosting the world SIM manager 300 does not need a physical SIM card. Rather, the initial modem programmer 301 pre-programs the modem of the user device with a default SIM profile 314 associated with a default wireless carrier. The default SIM profile 314 may be loaded into secure memory (e.g., one time programmable (OTP) memory) on the modem during initial modem programming. In one embodiment, the initial modem programmer 301 also pre-programs the modem with a default modem profile 316 that defines network connection parameters for the default wireless network. The initial modem programmer 301 saves the default modem profile 316 to non-volatile memory on the modem.

The network parameter detector 302 is responsible for detecting a wireless network at a current location of the user device based on information received from a cell phone tower via a control channel when the user device is powered on. Upon detecting the wireless network, the network parameter detector 302 determines data identifying the wireless network such as the MCC and the MNC, and decides whether the default SIM profile corresponds to the detected wireless network. If so, the network parameter detector 302 designates the default SIM profile to be used for network connectivity. If the default SIM profile does not correspond to the detected wireless network, the network parameter detector 302 invokes the profile provider 304.

The profile provider 304 is responsible for obtaining a device profile corresponding to a primary wireless network. This device profile includes a SIM profile and, in some embodiments, a modem profile corresponding to the primary wireless network. The profile provider 304 may include a profile search engine 306 and or a profile requestor 308.

In one embodiment, the profile provider 304 identifies a primary wireless network at the current location of the user device using information stored in the user device. In particular, the modem of the user device may stores a list of different geographic regions and a primary network at each of the geographic regions. For example, the list may include various countries and a primary wireless network in each country (e.g., AT&T® in the U.S., Vodafone in the U.K., T-Mobile® in Germany, and so on). In another embodiment, the profile provider 304 identifies a primary wireless network at the current location of the user device by sending location information (the MCC and the MNC) to the item providing system and requesting information identifying the primary wireless network at this location.

In one embodiment, once the profile provider 304 identifies the primary wireless network, it obtains the appropriate profile using the profile search engine 304 that searches a SIM profile data store 320 for an appropriate SIM profile. The SIM profile data store 320 may include SIM profiles of various wireless carriers and can reside in a secure memory (e.g., secure OTP memory) on the modem. The SIM profile data store 320 may be a database, a set of files, a single file, or any other data structure. Optionally, the SIM profiles in the data store 320 and/or the default SIM profile 314 are encrypted for additional security. If the SIM profile data store 320 does not include a SIM profile corresponding to the primary wireless network, the profile provider 304 uses the profile requestor 308 to request the appropriate SIM profile from the item providing system. In one embodiment, the profile requestor 308 communicates with the item providing system to verify whether the SIM profiles in the SIM profile data store 320 are up-to-date. The profile requestor 308 may perform the verification when the user device is powered on or prior to accessing SIM profiles in the SIM profile data store 320. If any of the SIM profiles are outdated, the profile requestor 308 creates a record of it (e.g., in a designated file or database). The profile provider 304 then checks this information to determine whether the SIM profile data store 320 contains the latest version of the desired SIM profile. If not, the profile requestor 308 requests the latest version from the item providing system.

In an alternative embodiment, the SIM profiles are not stored on the user device. Instead, they are stored on the item providing system, and the profile provider 304 uses the profile requestor 308 to request the desired SIM profile from the item providing system. In particular, the profile provider 304 may first identify the primary network using location information (a list of geographical regions with corresponding primary networks) and then use the profile requestor 308 to request a SIM profile of the primary wireless network from the item providing system. Alternatively, if the user device does not store primary network data, the profile requestor 308 may provide current location information (the MCC and the MNC) to the item providing system and request a SIM profile of the primary wireless network at the current location.

In yet another embodiment, the network parameter detector 302 may detect several wireless networks at the current location of the user device. If the default SIM profile 314 corresponds to any of the detected wireless networks, the default SIM profile 314 is designated as an active SIM profile. If not, the profile provider 304 determines whether the SIM profile data store 320 contains a SIM profile corresponding to any of the detected wireless networks. If so, this SIM profile is designated as an active SIM profile. If not, the profile requestor 308 provides a list of detected wireless networks to the item providing system and requests a SIM profile corresponding to any of the detected wireless networks.

In some embodiments, the secure memory on the modem also includes a modem profile data store 318 that contains modem profiles associated with various wireless carriers. The modem profile data store 318 may be a database, single or multiple files, or any other data structure. The profile provider 304 may use the profile search engine 306 to retrieve a modem profile corresponding to the primary wireless network or may use the profile requestor 308 to request such a modem profile from the item providing system.

The modem reprogrammer 310 reprograms the modem of the user device with the SIM profile obtained by the profile provider 304. In one embodiment, the modem reprogrammer 310 also updates the nonvolatile memory of the modem with the modem profile obtained by the profile provider 304. The modem reprogrammer 510 then automatically power cycles the modem to initiate network connection using the new SIM profile (and the new modem profile where applicable).

In some embodiments, the modem reprogrammer 310 is invoked during the initial modem programming when the user device is assembled. In particular, when the modem is manufactured, it can be loaded with several modem profiles corresponding to different wireless carrier. During manufacturing of the user device, the modem can be programmed with the default SIM profile 314. Based on the default SIM profile 314, the modem reprogrammer 310 can identify a corresponding modem profile and can save this modem profile to the nonvolatile memory of the modem as a default modem profile 316.

The registration module 312 sends a registration request to the item providing system. The registration request includes the identifier of the user device and specifies the SIM profile currently used by the user device.

Embodiments of the invention enable a modem manufacturer to build a single version of the modem for use with different wireless carriers. The modem does not need to be built with a carrier-specific stock-keeping unit (SKU) identifier. Instead, assignment of carrier-specific SKUs can be delayed until the user device is built. Furthermore, during the operation of the user device, the modem can be automatically reconfigured to use a primary wireless network at a current location of the user device, thus eliminating roaming charges or reducing billing rates, and/or improving quality of network connection.

Figure 4:
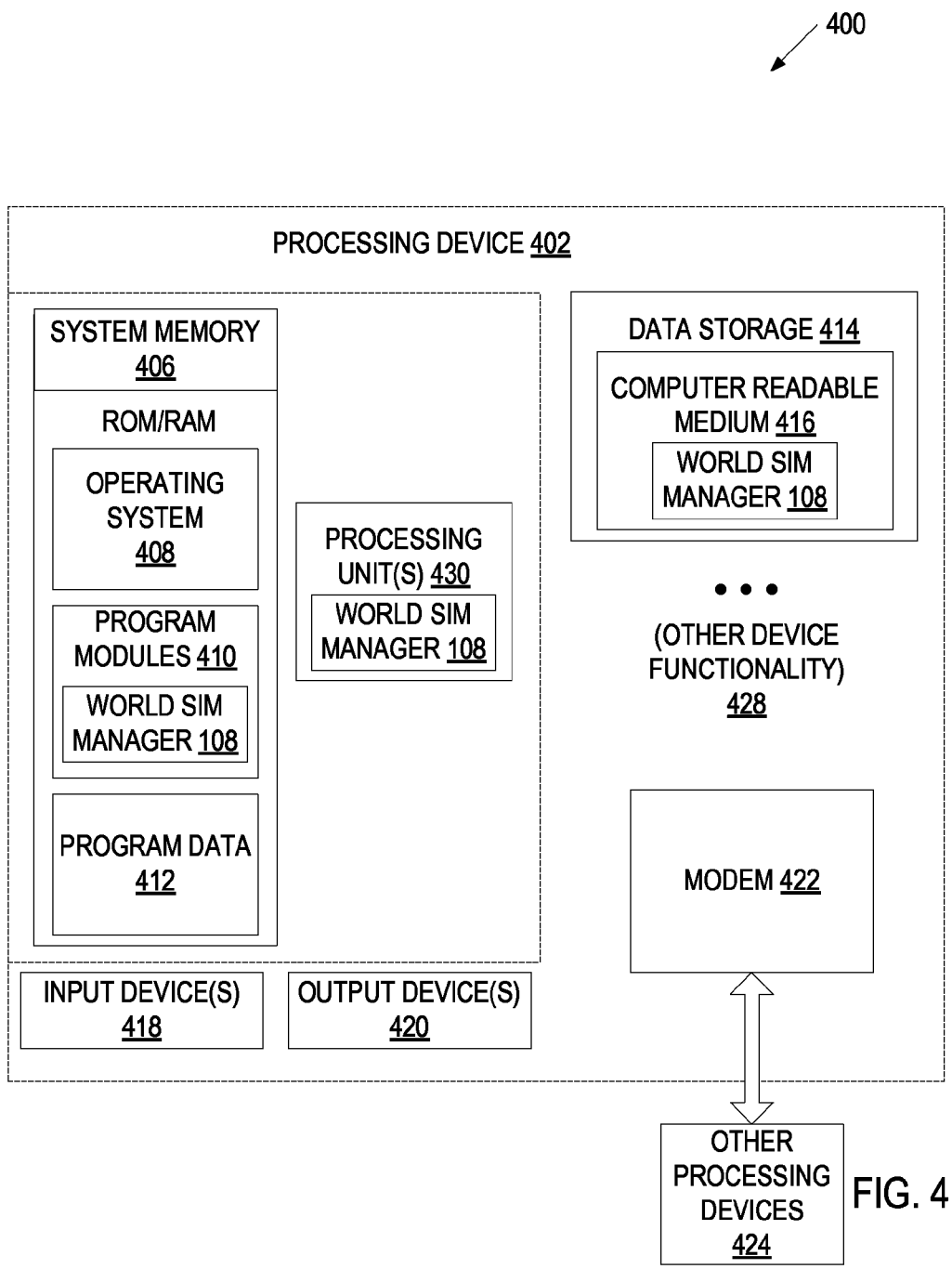
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including world SIM manager 108, program data 412, and/or other components. The user device 400 performs functions by using the processing unit(s) 404 to execute the world SIM manager 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the world SIM manager 108) embodying any one or more of the methodologies or functions described herein. As shown, instructions of the world SIM manager 108 may also reside, completely or at least partially, within the system memory 406 and/or within the processing unit(s) 430 during execution thereof by the user device 400, the system memory 406 and the processing unit(s) 430 also constituting computer-readable media. The instructions of the world SIM manager 108 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with other computing devices 424, such as remote computers, the item providing system, and so forth. The wireless modem 422 may allow the user device 400 to receive a telephone ring and also communicate with the item providing system in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), and WiFi.

The above-enumerated list of modules is representative and is not exhaustive of the types of functions performed by the user device 400. As indicated by the label "Other Device Functionality" 428, the user device 400 may include additional functions.

Figure 5:
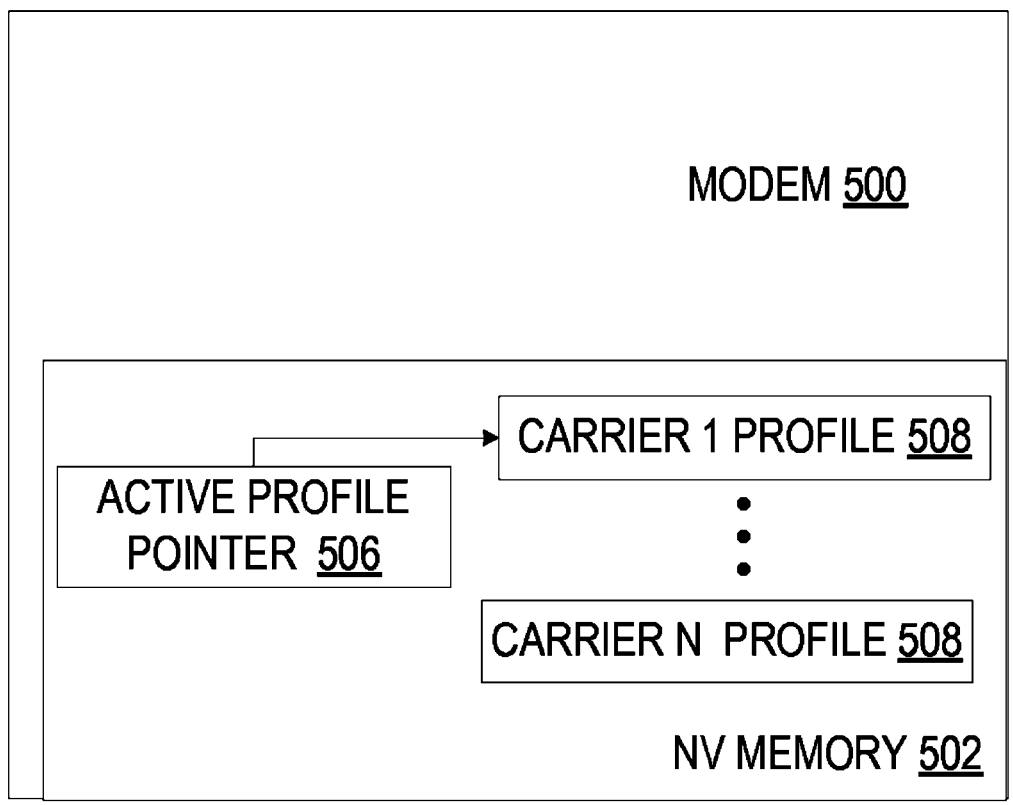
FIG. 5 illustrates a mechanism for configuring a modem of a user device in accordance with some embodiments of the invention.

FIG. 5 illustrates a mechanism for configuring a modem of a user device such as an electronic book reader in accordance with some embodiments of the invention. The modem 500 includes a nonvolatile memory 502. During operation of the electronic book reader, the modem 500 accesses a modem profile stored in the nonvolatile memory 502 to determine connection parameters of a wireless carrier to be used by the electronic book reader. Typically, a modem manufacturer stores a modem profile of a specific wireless carrier in the nonvolatile memory 502 when the modem 500 is built, and assigns a carrier specific SKU to the modem 500. An electronic book reader manufacturer usually has several production lines associated with different wireless carriers, where each production line uses modems associated with a specific wireless carrier and SIM cards associated with the same carrier. The selection of modems and SIM cards is performed based on modem SKUs and SIM card SKUs.

Embodiments of the invention eliminate the need for multiple modem versions by loading a set of modem profiles associated with different wireless carriers into secure memory during modem manufacturing. For example, the secure nonvolatile memory 502 on the modem 500 may include a modem profile store that includes profiles 508 of different wireless carriers (e.g., AT&T®, Vodafone, Verizon, T-Mobile®). When an electronic book reader is assembled in the factory, the modem 500 is programmed with a default SIM profile (e.g., Vodafone SIM profile). Based on the default SIM profile, a corresponding modem profile (e.g., Vodafone SIM profile) is activated in the nonvolatile memory 502. In the illustrated embodiment, an active profile pointer 506 is set to point to the address of the appropriate modem profile 508 (e.g., carrier 1 profile 508) in the nonvolatile memory 502. Alternatively, any other mechanism can be used to designate one of the modem profiles 508 as an active modem profile. Hence, with embodiments of the invention, a single version of the modem can be used for different wireless carriers, and the modem does not need to have a carrier-specific SKU.

In addition, the use of carrier-specific SIM cards is eliminated by maintaining SIM profiles of different wireless carriers and programming a modem of the electronic book reader with a default SIM profile during electronic book reader device manufacturing. When the electronic book reader is powered on, the default SIM profile and the default modem profile may not correspond to a wireless network detected at the current location of the electronic book reader. Then, the modem 500 will be automatically reconfigured to a primary wireless network at the current location of the electronic book reader by reprogramming the modem 500 with a SIM profile corresponding to the primary wireless network, and replacing the default modem profile in the nonvolatile memory 502 with a modem profile of the primary wireless network.

Figure 6:
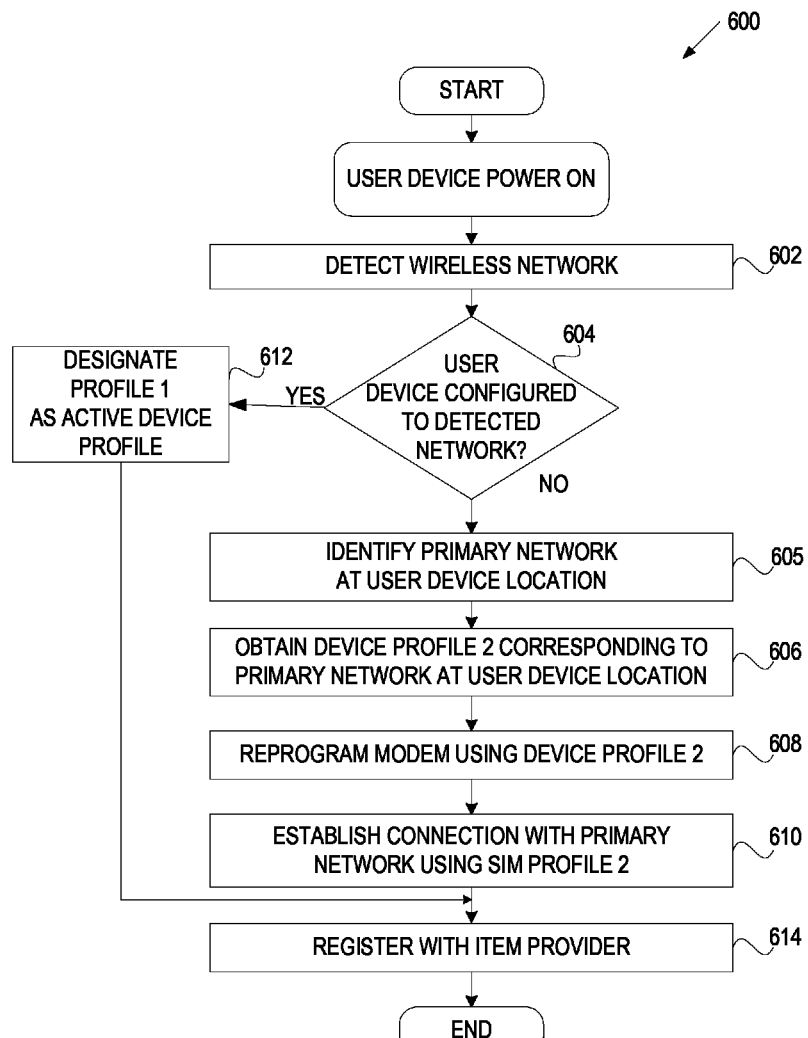
FIG. 6 is a flow diagram of one embodiment of a method for enabling a user device to use different wireless carriers for network connectivity.
Figure 7:
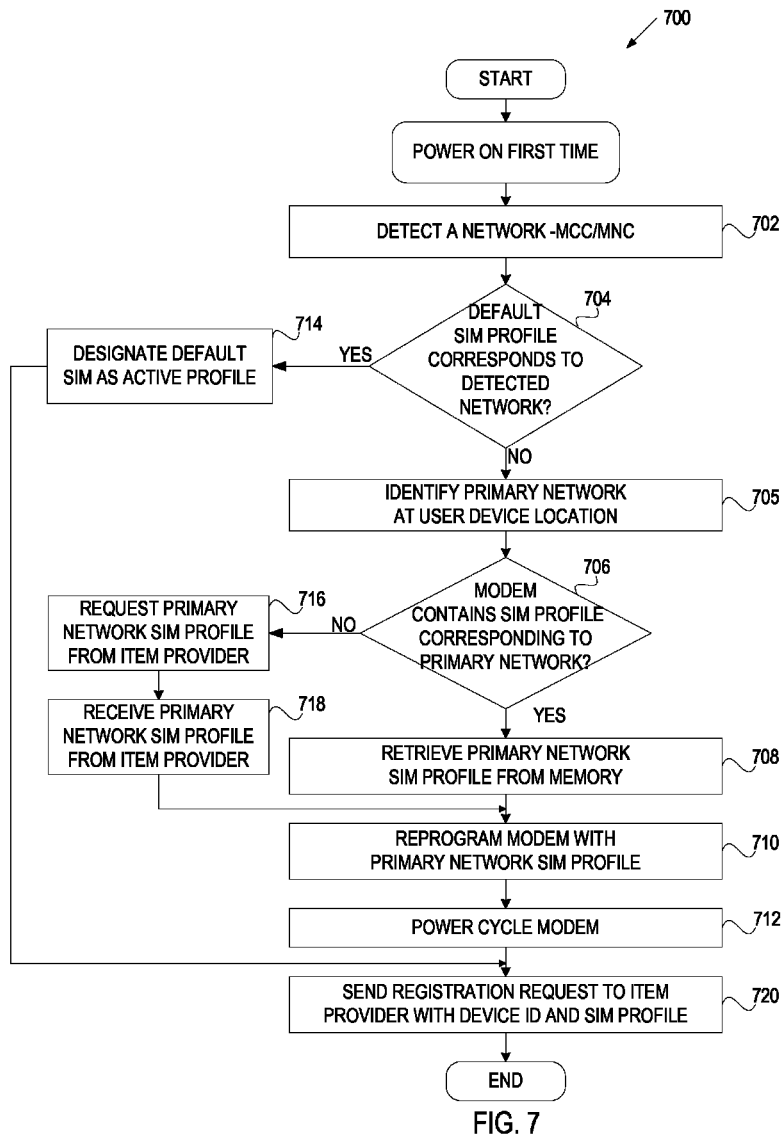
FIG. 7 is a flow diagram of one embodiment of a method for utilizing multiple subscriber identity module (SIM) profiles to switch from a secondary wireless network to a primary wireless network.

FIGS. 6 and 7 are flow diagrams of some embodiments of a method for automatically reconfiguring a user device to a different wireless carrier. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a world SIM manager 108 of user device 102 of FIG. 1).

Referring to FIG. 6, method 600 starts when the user device is powered on. At block 602, the user device detects a wireless network at the current location based on information received from a cell phone tower via a control channel. At block 604, the user device determines whether the user device is presently configured to the detected wireless network. In one embodiment, this determination is made by comparing the detected network's MCC and MNC included in the information received via the control channel with the MCC and MNC in a default SIM profile stored in the secure memory on the modem.

If the user device is presently configured to the detected wireless network, the user device designates a first device profile as an active device profile (block 612) and the method 600 proceeds to block 614. The first device profile includes the default SIM profile. In one embodiment, the first device profile also includes a default modem profile stored in nonvolatile memory of the modem.

Otherwise, if the user device is not presently configured to the detected wireless network, the user device identifies a primary wireless network at the current location of the user device (block 605), and obtains a second device profile corresponding to the primary wireless network (block 606). In one embodiment, the user device identifies a primary wireless network at the current location of the user device using local data identifying different geographic areas and corresponding primary networks. In another embodiment, the user device identifies a primary wireless network at the current location of the user device by requesting this information from the item providing system. In addition, in one embodiment, the user device obtains the second device profile by retrieving it from the secure memory on the modem. In another embodiment, the user device obtains the second device profile by requesting it from the item providing system. In some embodiments, in which the user device does not store local data identifying different geographic areas and corresponding primary networks and does not store device profiles other than the default device profile, the user device skips block 605 and performs block 606 by providing the location data (the MCC and the MNC) to the item providing system and requesting a device profile of a primary network at this location At block 608, the user device reprograms the modem with the second device profile. At block 610, the user device establishes a connection with the primary wireless network using the second device profile. In one embodiment, the user device power-cycles the modem to establish a connection with the primary wireless network using the second device profile.

At block 614, the user device sends a registration request to the item providing system. The registration request may include the identifier of the user device (DID) and the identifier of the SIM profile corresponding to the primary wireless network.

Method 600 may be performed when the user device is powered on for the first time. In addition, in some embodiments, method 600 may be repeated when the user device is subsequently powered on (e.g., at a different geographic location or at a different time).

FIG. 7 is a flow diagram of one embodiment of a method 700 for utilizing multiple SIM profiles to switch from a secondary wireless network to a primary wireless network. Method 700 starts when the user device is powered on for the first time. At block 702, the user device detects a wireless network at the current location based on information received from a cell phone tower via a control channel, and determines the MCC and the MNC of the detected wireless network based on this information.

At block 704, the user device determines whether a default SIM profile stored in the secure memory on the modem corresponds to the detected wireless network using the MCC and the MNC determined at block 702. If so, the user device designates the default SIM profile as an active SIM profile (block 714) and the method 700 proceeds to block 720. In one embodiment, the user device also checks whether the default SIM profile is up-to-date. If the default SIM profile is up-to-date, the method proceeds to block 714. If the default SIM profile is outdated, the user device requests a current version of this SIM profile from the item providing system and the method proceeds to block 714.

If the default SIM profile does not correspond to the detected wireless network, the user device identifies a primary wireless network at the current location of the user device (block 705) and determines whether the modem contains a SIM profile corresponding to the primary wireless network (block 706). If so, the user device also determines whether this SIM profile is up-to-date. If the SIM profile is up-to-date, the method proceeds to block 708 to retrieve the SIM profile corresponding to the primary network from the secure memory on the modem. The user device may also have to decrypt the SIM profile if it was stored in an encrypted form. If the SIM profile is outdated, the method proceeds to block 716.

If the modem does not contain a current SIM profile corresponding to the primary network, the user device requests a current version of this SIM profile from the item providing system (block 716), and receives the current version of the SIM profile corresponding to the primary network (block 718). The method then proceeds to block 710.

At block 710, the user device reprograms the modem with the obtained SIM profile. At block 712, the user device power-cycles the modem to implement the new profile and establish a connection with the primary wireless network using the obtained SIM profile.

Figure 8:
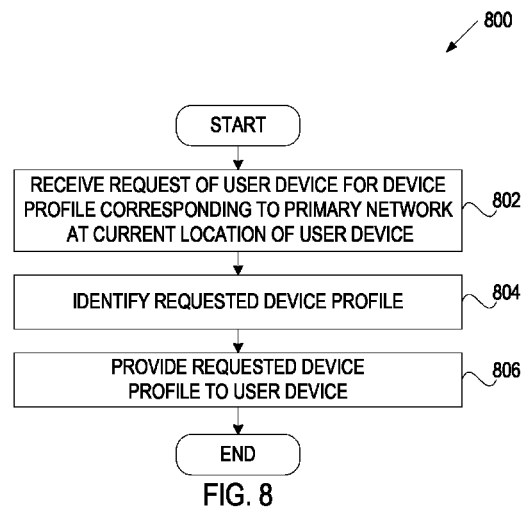
FIG. 8 is a flow diagram of one embodiment of a method to provide a device profile for a wireless carrier to a user device.
Figure 9:
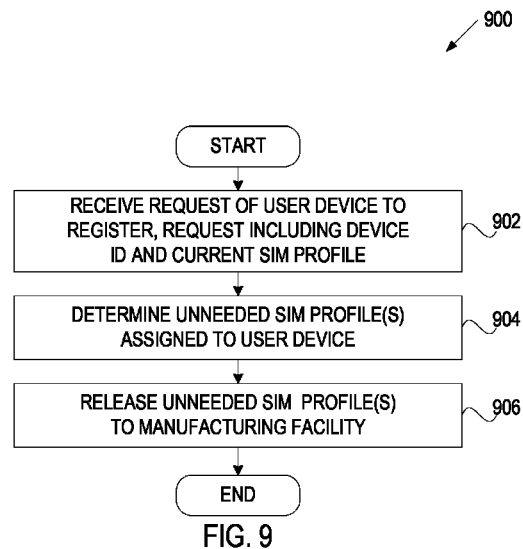
FIG. 9 is a flow diagram of one embodiment of a method for releasing unused SIM profiles assigned to a user device.

FIGS. 8 and 9 are flow diagrams of some embodiments of a server-side method for facilitating the reconfiguration of user devices to different wireless carriers. The method is performed by processing logic that may comprise hardware (circuitry, dedicated logic, etc.), software (such as is run on a general purpose computer system or a dedicated machine), or a combination of both. In one embodiment, the method is performed by an item providing system (e.g., a device profile module 110 of the item providing system 104 of FIG. 1).

FIG. 8 is a flow diagram of one embodiment of a method 800 to provide a device profile for a wireless carrier to a user device. At block 802, the item providing system receives a request of a user device for a device profile corresponding to a specific wireless carrier. In another embodiment, the request includes data identifying the current location of the user device (MCC and MNC) and asks for a device profile of a primary wireless network at the current location of the user device. In yet another embodiment, the request identifies multiple wireless networks detected at the current location of the user device and asks for a device profile of a preferred (primary) one of the detected networks. A device profile may include a SIM profile and, in one embodiment, a modem profile corresponding to a specific wireless carrier.

At block 804, the item providing system identifies the requested device profile. In one embodiment, the item providing system first searches a SIM profile data store for a SIM profile corresponding to the specific carrier, and then searches a modem profile data store for a modem profile corresponding to the specific carrier. Alternatively, the SIM profiles and the modem profiles are stored in a single data store, and the item providing system searches a single data store for both profiles. Yet alternatively, the item providing system first identifies a primary wireless network at the current location of the user device, and then obtains the SIM and modem profiles of this network. At block 806, the item providing system returns the requested device profile to the user device.

In some embodiments, in which at least some of the device profiles are stored locally on a user device, the item providing system informs the user device about the stored device profiles that are no longer up-to-date. For example, during each session between the item providing system and the user device, the item providing system may verify whether the SIM profiles stored on the user device are current, and notify the user device about the device profiles that are no longer current. Subsequently, when the user device needs one of those device profiles, it may send a request for the current version of this device profile to the item providing system, and the item providing system will send the current version of the device profile to the user device.

FIG. 9 is a flow diagram of one embodiment of a method 900 for releasing unused SIM profiles assigned to a user device. At block 902, the item providing system receives a registration request of a user device. The request may include the device ID and an identifier of a current SIM profile used by the user device.

At block 904, the item providing system determines SIM profiles that are unlikely to be needed by the user device. In one embodiment, the item providing system maintains a list of SIM profiles stored on the user device. Based on this list, the item providing system may determine whether the user device currently uses a default SIM profile. If not, the item providing system may add the default SIM profile to a list of unneeded SIM profiles. In addition, in some embodiments, the item providing system may determine the country where the user device is presently located based on the current SIM profile, and may add the SIM profiles of wireless devices from the other countries to the list of unneeded SIM profiles. Various other criteria may be used to identify unneeded SIM profiles without loss of generality.

At block 906, the item providing system releases the unneeded SIM profile(s) to a manufacturing facility that builds user devices. The manufacturing facility may then reuse these SIM profiles when building new user devices.

Figure 10:
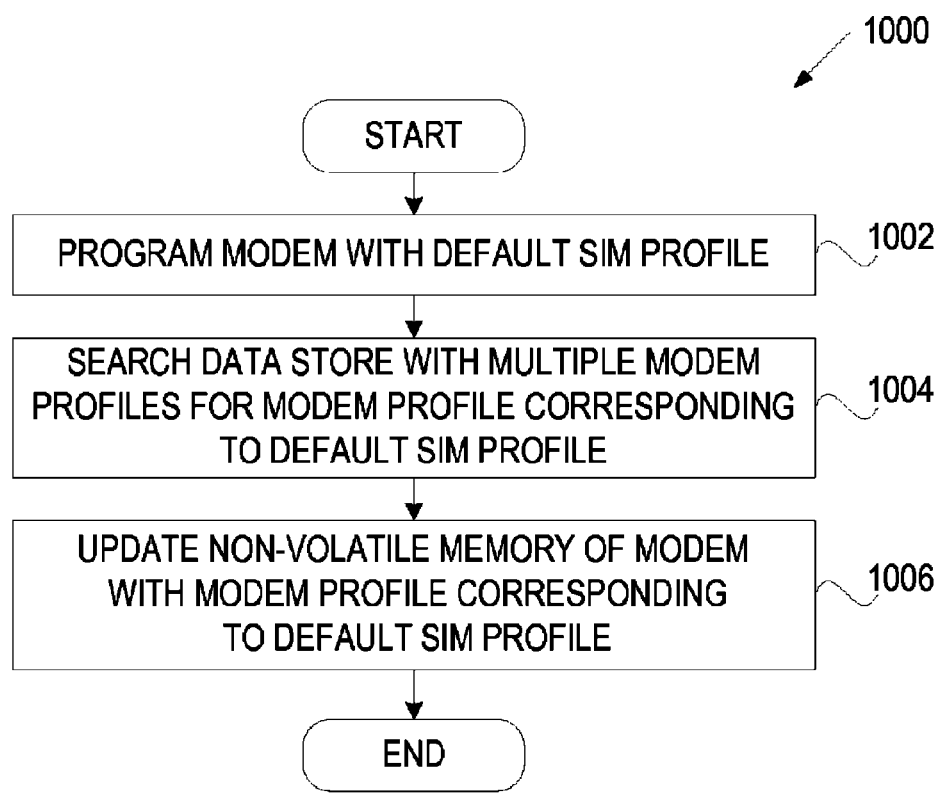
FIG. 10 is a flow diagram of one embodiment of a method for reprogramming a modem of a user device according to a default SIM profile.
Figure 11:
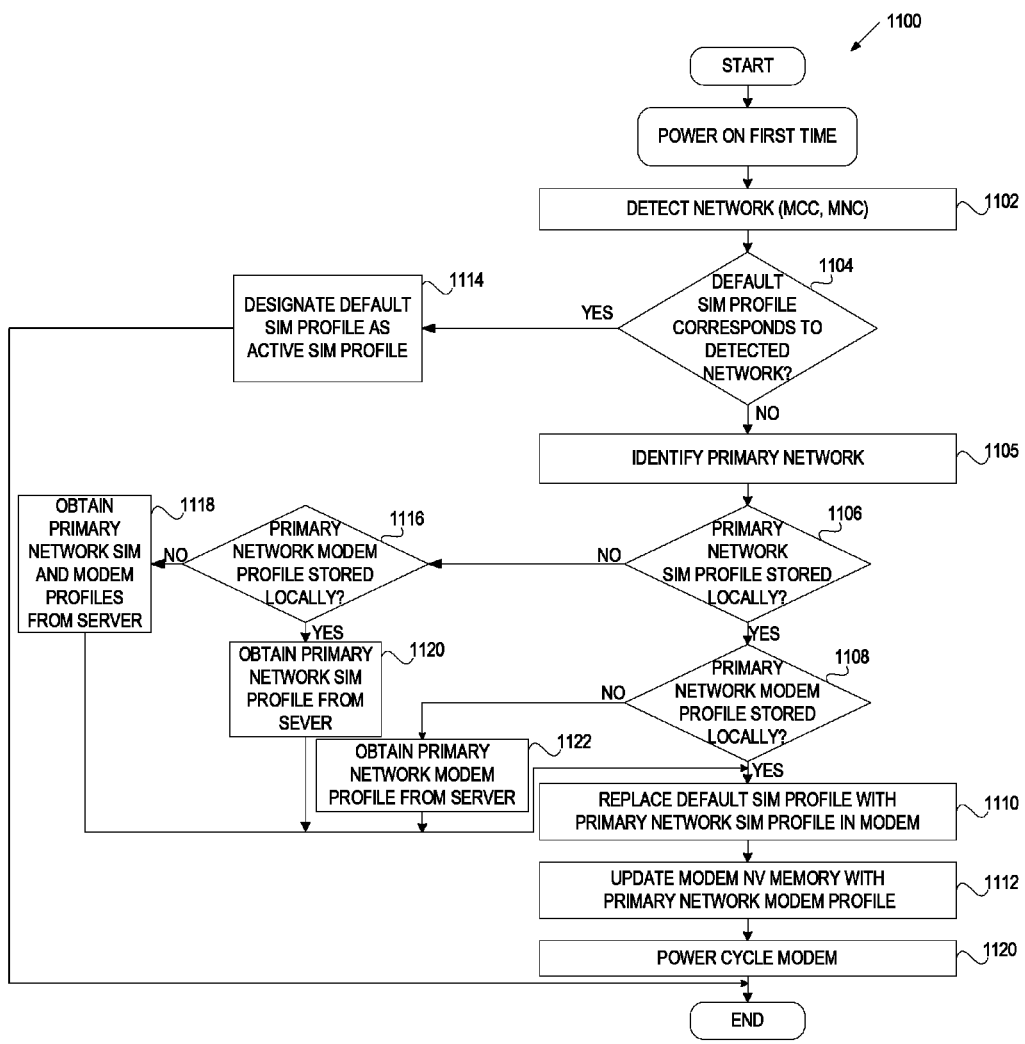
FIG. 11 is a flow diagram of one embodiment of a method for updating a modem profile according to a SIM profile corresponding to a primary wireless network.

FIGS. 10 and 11 are flow diagrams of some embodiments of a method for enabling a single version of modem firmware for use with different wireless carriers. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a modem reprogrammer 310 of world SIM manager 300 of FIG. 3).

FIG. 10 is a flow diagram of one embodiment of a method 1000 for reprogramming a modem of a user device according to a default SIM profile. Method 1000 starts at block 1002 with programming the modem with a default SIM profile when building the user device. At block 1004, the modem reprogrammer identifies a modem profile corresponding to the default SIM profile (block 1002). In one embodiment, the modem reprogrammer searches a modem profile store having multiple modem profiles associated with different wireless carriers. The multiple modem profiles may be loaded onto secure memory on the modem during modem manufacturing.

At block 1006, the modem reprogrammer saves the identified modem profile to the nonvolatile memory of the modem.

FIG. 11 is a flow diagram of one embodiment of a method 1100 for updating a modem profile according to a SIM profile corresponding to a primary wireless network. Method 1100 starts when the user device is powered on for the first time. At block 1102, the user device detects a wireless network at the current location based on information received from a cell phone tower via a control channel, and determines the MCC and the MNC of the detected wireless network based on this information.

At block 1104, the user device determines whether a default SIM profile stored in the secure memory on the modem corresponds to the detected wireless network using the MCC and the MNC determined at block 1102. If so, the user device designates the default SIM profile as an active SIM profile (block 1114) and the method 1100 ends.

Alternatively, if the default SIM profile does not correspond to the detected wireless network, the user device identifies a primary wireless network at the current location of the user device, and determines whether the modem contains a SIM profile corresponding to the primary wireless network (block 1106). If so, the user device also determines whether a modem profile corresponding to the primary wireless network is stored locally (block 1108). If both profiles are stored locally, the user device retrieves the profiles from local memory and the method proceeds to block 1110. If a modem profile corresponding to the primary network is not stored locally, the user devices obtains the modem profile corresponding to the primary network from the item providing system (block 1122) and the method proceeds to block 1110.

If the modem does not contain a SIM profile corresponding to the primary network (block 1106), the user device further determines whether the modem contains a modem profile corresponding to the primary network (block 1116). If not, the user device obtains both SIM and modem profiles from the item providing system (block 1118) and the method proceeds to block 1110. If so, the user device obtains the SIM profile from the item providing system (block 1120) and the method proceeds to block 1110.

At block 1110, the user device replaces the default SIM profile with the obtained SIM profile in memory on the modem. At block 1112, the user device updates the nonvolatile memory of the modem with the obtained modem profile. At block 1120, the user device power-cycles the modem to implement the new profile and establish connection with the primary network using the corresponding SIM profile and modem profile.

Figure 12:
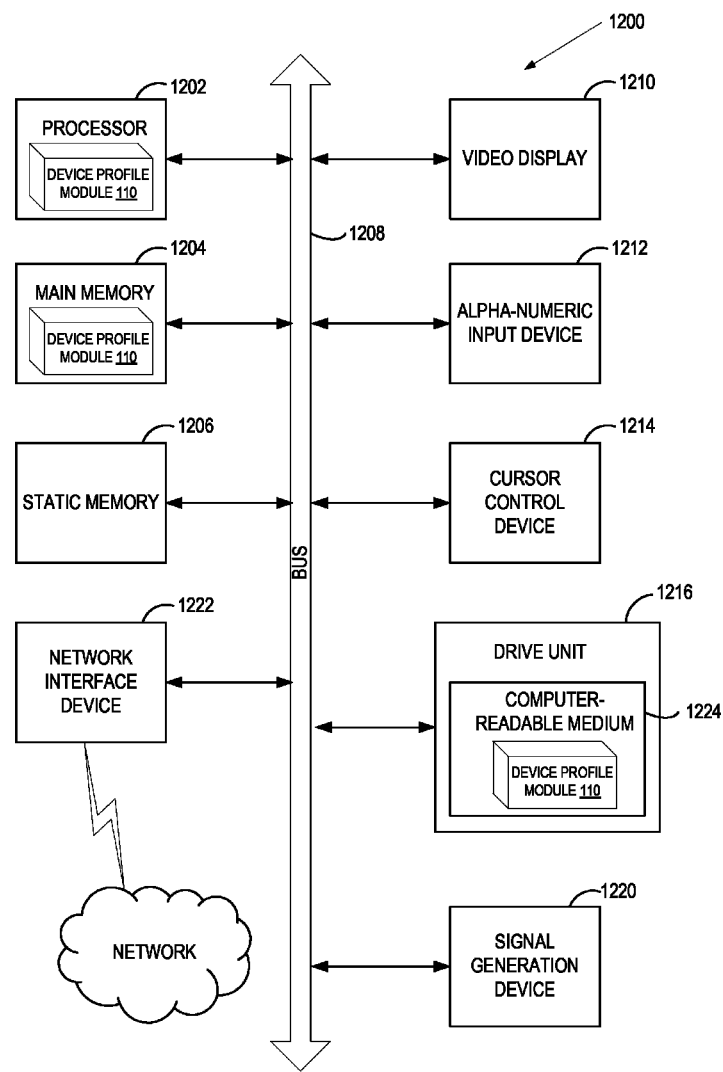
FIG. 12 illustrates an exemplary item providing system.

FIG. 12 illustrates an exemplary item providing system 1200 in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing system (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1216, which communicate with each other via a bus 1208.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute the device profile module 110 for performing the operations and steps discussed herein.

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1216 may include a computer-readable medium 1224 on which is stored one or more sets of instructions (e.g., instructions of device profile module 110) embodying any one or more of the methodologies or functions described herein. The device profile module 110 may also reside, completely or at least partially, within the main memory 1204 and/or within the processor 1202 during execution thereof by the computer system 1200, the main memory 1204 and the processor 1202 also constituting computer-readable media. The device profile module 110 may further be transmitted or received over a network 1220 via the network interface device 1222.

While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting", "determining", "obtaining", "reprogramming", "establishing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
upon a power-on of a user device that does not include a subscriber identity module (SIM) card, detecting, by the user device, at least one wireless network at a current location of the user device;
determining, by the user device, that a default device profile stored on the user device does not correspond to the detected wireless network at the current location of the user device;
obtaining a device profile comprising a SIM profile and a modem profile corresponding to a primary wireless network at the current location of the user device, wherein the primary wireless network uses a standard that specifies the use of SIM cards, and wherein the SIM profile comprises an international mobile subscriber identity (IMSI) comprising a mobile country code (MCC) of the primary wireless network, a mobile network code (MNC) of the primary wireless network and a mobile station identification number (MSIN) associated with the primary wireless network and acts as a substitute for the SIM card by associating the user device with the primary wireless network and providing additional functionality conventionally provided by the SIM card, and wherein the modem profile comprises connection parameters of the primary wireless network, the connection parameters comprising wireless protocol configuration data;
responsive to detecting that the default device profile does not correspond to the detected wireless network, reprogramming a modem of the user device using the device profile comprising the SIM profile and the modem profile corresponding to the primary wireless network at the current location of the user device;
power cycling the modem of the user device after reprogramming the modem to initiate a network connection using the device profile; and
establishing the network connection using the device profile comprising the SIM profile and the modem profile corresponding to the primary wireless network at the current location of the user device responsive to the power cycling.

2. The method of claim 1 wherein the user device is an electronic book reader device.

3. The method of claim 1 further comprising determining the MCC and the MNC associated with the detected wireless network.

4. The method of claim 1 wherein obtaining the device profile comprising the SIM profile and the modem profile corresponding to the primary wireless network at the current location of the user device comprises:
identifying the primary wireless network at the current location of the user device;
if the user device stores a device profile comprising the SIM profile and the modem profile corresponding to the primary wireless network at the current location of the user device, retrieving the device profile from local memory; and
if the user device does not store the device profile comprising the SIM profile and the modem profile corresponding to the primary wireless network at the current location of the user device, requesting the device profile from a server.

5. The method of claim 1 further comprising:
sending a request to the server to register the user device with the server, the request comprising the SIM profile corresponding to the primary wireless network at the current location of the user device and an identifier of the user device.

6. The method of claim 1, wherein:
the power-on of the user device is a first power-on of the user device by a user;
the user device does not have a home wireless network at a time of the power-on; and
the primary wireless network will be the home wireless network for the user device.

7. A method comprising:
receiving, by a processor, a request of a user device for a device profile corresponding to a primary wireless network at a current location of the user device, the request comprising data identifying the primary wireless network at the current location of the user device;
identifying one of a plurality of device profiles that matches the data identifying the primary wireless network at the current location of the user device; and
providing, by the processor, the matching device profile to the user device, wherein the matching device profile comprises a modem profile and a subscriber identity module (SIM) profile that will be used to register the user device to the primary wireless network without the use of a SIM card responsive to the user device power cycling a modem of the user device to initiate a network connection using the SIM profile, wherein the primary wireless network uses a standard that specifies the use of SIM cards, and wherein the SIM profile comprises an international mobile subscriber identity (IMSI) comprising a mobile country code (MCC) of the primary wireless network, a mobile network code (MNC) of the primary wireless network and a mobile station identification number (MSIN) associated with the primary wireless network and acts as a substitute for the SIM card by associating the user device with the primary wireless network and providing additional functionality conventionally provided by the SIM card, and wherein the modem profile comprises connection parameters of the primary wireless network, the connection parameters comprising wireless protocol configuration data.

8. The method of claim 7 wherein the user device is an electronic book reader.

9. The method of claim 7 wherein the data identifying the primary wireless network at the current location of the user device comprises the MCC and the MNC.

10. The method of claim 7 further comprising:
receiving a request of the user device to register the user device with an item provider, the request comprising an identifier of the user device and the SIM profile corresponding to the primary wireless network at the current location of the user device;
determining at least one default SIM profile the was assigned to the user device during manufacturing of the user device; and
releasing the at least one default SIM profile assigned to the user device for subsequent reuse of the default SIM profile with a new user device.

11. The method of claim 7, wherein the SIM profile will be used to register the primary wireless network as a home wireless network for the user device.

12. A non-transitory computer readable storage medium comprising instructions that, when executed by a processor, cause the processor to perform operations comprising:

upon a power-on of the user device, determining, by the processor, data identifying a current location of the user device;

obtaining a device profile corresponding to a primary wireless network at the current location of the user device, the device profile comprising a subscriber identity module (SIM) profile and a modem profile, wherein the primary wireless network uses a standard that specifies the use of SIM cards, wherein the SIM profile comprises an international mobile subscriber identity (IMSI) comprising a mobile country code (MCC) of the primary wireless network, a mobile network code (MNC) of the primary wireless network and a mobile station identification number (MSIN) associated with the primary wireless network and acts as a substitute for a SIM card by associating the user device with the primary wireless network and providing additional functionality conventionally provided by the SIM card, and wherein the modem profile comprises connection parameters of the primary wireless network, the connection parameters comprising wireless protocol configuration data;

reprogramming, by the processor, a modem of the user device using the device profile comprising the SIM profile and the modem profile corresponding to the primary wireless network at the current location of the user device;

power cycling the modem of the user device after reprogramming the modem; and responsive to power cycling the modem, registering the user device with the primary wireless network based on the SIM profile and without the use of any SIM card, and establishing a network connection using the device profile corresponding to the primary wireless network at the current location of the user device.

13. The non-transitory computer readable storage medium of claim 12 wherein:
reprogramming the modem of the user device using the device profile comprises updating a non-volatile memory of the modem with the modem profile.

14. The non-transitory computer readable storage medium of claim 12 wherein the user device is an electronic book reader device.

15. The non-transitory computer readable storage medium of claim 12 wherein the operations further comprise:
obtaining, via a control channel, the MCC and the MNC associated with the current location of the user device; and
determining that the MCC and the MNC associated with the current location of the user device do not match an MCC and an MNC included in a default device profile.

16. The non-transitory computer readable storage medium of claim 12 wherein obtaining the device profile corresponding to the primary wireless network at the current location of the user device comprises:
identifying the primary wireless network at the current location of the user device;
sending a request for the device profile corresponding to the primary wireless network at the current location of the user device to a server; and
receiving the device profile corresponding to the primary wireless network at the current location of the user device from the server.

17. The non-transitory computer readable storage medium of claim 12 wherein obtaining the device profile corresponding to the primary wireless network at the current location of the user device comprises:

searching a one-time programmable (OTP) memory on the modem for the device profile corresponding to the primary wireless network at the current location of the user device; and
retrieving the device profile corresponding to the primary wireless network at the current location of the user device from the OTP memory.

18. The non-transitory computer readable storage medium of claim 12 wherein reprogramming the modem of the user device comprises replacing a default device profile with the device profile corresponding to the primary wireless network at the current location of the user device.

19. The non-transitory computer readable storage medium of claim 12 further comprising:
sending a request to the server to register the user device with the server, the request comprising the device profile corresponding to the primary wireless network at the current location of the user device and an identifier of the user device.

20. A user device system comprising:
a memory;
a modem;
a processor, coupled to the memory and to the modem; and
a world subscriber identity module (SIM) manager, executed from the memory by the processor, to:
upon a power-on of the user device, determine whether a first device profile stored on the user device corresponds to a wireless network detected at a current location of the user device; and
responsive to a determination that the first device profile does not correspond to the detected network at the current location of the user device, perform the following comprising:
obtain a second device profile that corresponds to a primary wireless network at the current location of the user device, the second device profile comprising a SIM profile and a modem profile, wherein the primary wireless network uses a standard that specifies the use of SIM cards, wherein the SIM profile comprises an international mobile subscriber identity (IMSI) comprising a mobile country code (MCC) of the primary wireless network, a mobile network code (MNC) of the primary wireless network and a mobile station identification number (MSIN) associated with the primary wireless network and acts as a substitute for a SIM card by associating the user device with the primary wireless network and providing additional functionality conventionally provided by the SIM card, and wherein the modem profile comprises connection parameters of the primary wireless network, the connection parameters comprising wireless protocol configuration data,
reprogram the modem of the user device using the second device profile,
power cycle the modem, and
register the user device to the primary wireless network based on the SIM profile and without the use of any SIM card responsive to the power cycle of the modem.

21. The system of claim 20, wherein:
reprogramming the modem of the user device using the device profile comprises updating a non-volatile memory of the modem with the modem profile.

22. The system of claim 20 wherein the user device is an electronic book reader device.

23. The system of claim 20 wherein the world SIM manager is further to:

obtain, via a control channel, the MCC and the MNC associated with the current location of the user device; and determine that the MCC and the MNC associated with the current location of the user device do not match an MCC and an MNC included in a default device profile.

24. The system of claim 20 wherein the world SIM manager is to obtain a device profile corresponding to the primary wireless network at the current location of the user device by:

sending a request for the device profile corresponding to the primary wireless network at the current location of the user device to a server; and receiving the device profile corresponding to the primary wireless network at the current location of the user device from the server.

25. The system of claim 20 wherein the world SIM manager is to obtain a device profile corresponding to the primary wireless network at the current location of the user device by:

searching a one-time programmable (OTP) memory on the modem for the device profile corresponding to the primary wireless network at the current location of the user device; and retrieving the device profile corresponding to the primary wireless network at the current location of the user device from the OTP memory.

26. The system of claim 20 wherein the world SIM manager is further to:

send a request to the server to register the user device with the server, the request comprising the device profile corresponding to the primary wireless network at the current location of the user device and an identifier of the user device.

27. An item providing system comprising:

a memory;

a processor, coupled to the memory; and a device profile module, executed from the memory by the processor, to receive a request of a user device for a device profile comprising a subscriber identity module (SIM) profile and a modem profile corresponding to a primary wireless network at a current location of the user device, wherein the primary wireless network uses a standard that specifies the use of SIM cards, wherein the SIM profile comprises an international mobile subscriber identity (IMSI) comprising a mobile country code (MCC) of the primary wireless network, a mobile network code (MNC) of the primary wireless network and a mobile station identification number (MSIN) associated with the primary wireless network and acts as a substitute for a SIM card by associating the user device with the primary wireless network and providing additional functionality conventionally provided by the SIM card, and wherein the modem profile comprises connection parameters of the primary wireless network, the connection parameters comprising wireless protocol configuration data;

identify one of a plurality of device profiles that corresponds to the primary wireless network at the current location of the user device; and provide the device profile that corresponds to the primary wireless network at the current location to the user device, wherein the device profile will be used to register the user device to the primary wireless network without the use of any SIM card after a modem of the user device is power cycled.

28. The system of claim 27 wherein the device profile module is further to:

receive a request of the user device to register the user device with the item provider, the request comprising an identifier of the user device and the SIM profile corresponding to the primary wireless network at the current location of the user device;

determine at least one unneeded SIM profile assigned to the user device; and release the at least one unneeded SIM profile assigned to the user device for subsequent reuse of the default SIM profile with a new user device.

* * * * *